United States Patent [19]

Inoue et al.

[11] 4,269,432

[45] May 26, 1981

[54] INDEPENDENT WHEEL SUSPENSION FOR MOTOR VEHICLES

[75] Inventors: Hitoshi Inoue; Kenichi Watanabe; Takashi Sumimoto, all of Hiroshima, Japan

[73] Assignee: Toyo Kogyo Co., Ltd., Hiroshima, Japan

[21] Appl. No.: 40,084

[22] Filed: May 17, 1979

[30] Foreign Application Priority Data

May 24, 1978 [JP] Japan .................................. 53-62424
Sep. 14, 1978 [JP] Japan ........................... 53-126795[U]

[51] Int. Cl.³ .............................................. B60G 3/00
[52] U.S. Cl. .................................. 280/690; 180/73 TL
[58] Field of Search .............. 280/690, 689, 688, 701, 280/724, 725, 726; 180/73 TL, 73 TT

[56] References Cited

U.S. PATENT DOCUMENTS

| 3,759,542 | 9/1973 | Loffler | 180/73 TL |
| 3,892,284 | 7/1975 | Braess et al. | 280/690 |
| 3,893,701 | 7/1975 | Kroniger | 280/690 |

FOREIGN PATENT DOCUMENTS 2416616 10/1975 Fed. Rep. of Germany ........... 280/690
840909 7/1960 United Kingdom ..................... 280/697

Primary Examiner—John J. Love
Assistant Examiner—Ross Weaver
Attorney, Agent, or Firm—Wenderoth, Lind & Ponack

[57] ABSTRACT

A wheel suspension for a motor vehicle having a vehicle chassis includes a wheel carrier having an axle for the support of a wheel for rotation independently of the wheel carrier, and front and rear arms for supporting the wheel carrier on the vehicle chassis and extending in spaced relation to each other with the space therebetween gradually increasing as they extend outwardly from the wheel carrier towards the vehicle chassis in a direction generally transversely of the vehicle chassis. The wheel suspension further includes a connecting member for elastically connecting the wheel carrier to the vehicle chassis for displacement in a direction generally perpendicular to the widthwise direction of the vehicle chassis, and a shock absorber for absorbing vibrations of the wheel carrier. The front and rear arms are so positioned relative to the wheel carrier and the vehicle chassis that the wheel carrier can be moved such that the toe-in of the wheel supported thereby is increased.

8 Claims, 9 Drawing Figures

INDEPENDENT WHEEL SUSPENSION FOR MOTOR VEHICLES

BACKGROUND OF THE INVENTION

The present invention generally relates to a vehicle wheel suspension system and, more particularly, to an independent rear wheel suspension for motor vehicles.

The Japanese Laid-open Patent Publication laid open to public inspection under No. 49-26921 in 1974 discloses a vehicle rear wheel suspension having a construction as shown in FIG. 1 of the accompanying drawings. Referring to FIG. 1 of the accompanying drawings, wherein the only lefthand rear wheel and its suspension are diagrammatically shown as viewed from top of the vehicle, the prior art rear wheel suspension comprises a wheel carrier 1 having a wheel journal or axle for the support of a rear wheel 2 for rotation independently of the wheel carrier 1 and operatively coupled to a vehicle superstructure, particularly a chassis 4, by means of an arm member 3 which extends in a direction generally transversely of the vehicle superstructure and is operatively interposed between the wheel carrier 1 and the chassis 4. The arm member 3 is comprised of a stub 3a and a pair of forked front and rear arms 3b and 3c, it being to be understood that the terms "front" and "rear" referred to above and hereinafter throughout the specification and the appended claims are used to denote respective positions defined in terms of the vehicle superstructure. The stub 3a has a free end hingedly and yieldingly connected to a lateral portion of the chassis 4 while respective free ends of the front and rear arms 3b and 3c, which are forked from the stub 3a, are hingedly and yieldingly connected at A and B to front and rear portions of the wheel carrier 1 by means of associated rubber bushings. The prior art rear wheel suspension further comprises a tension rod 5 having one end hingedly and yieldingly connected to a front portion of the chassis 4 and the other end hingedly and yieldingly connected to a portion of the arm 3b adjacent the wheel carrier 1.

The prior art rear wheel suspension having the construction shown in FIG. 1 has some disadvantages. By way of example, when a load P acting in a direction rearwardly of the vehicle superstructure is applied to the area of contact of the wheel 2, particularly the tire on the wheel 2, to the road surface as the wheel encounters irregularities in the road, the rubber bushings used at the various joints undergo elastic deformation to such an extent that the arm member 3 is rearwardly displaced from the position shown by the solid lines to the position shown by the broken lines, causing the wheel 2 to point outwards, that is, to toe out, rather than to point straight ahead, and the joints A and B are consequently displaced to the respective positions shown by A' and B'. This tendency of the wheel 2 to toe out not only has an adverse influence on the tire, but also adversely affects the riding quality of the vehicle as is well known to those skilled in the art. This tendency of the wheel 2 to toe out is increased if the wheel carrier 1 is made easily displaceable relative to the chassis 4, which in turn adversely affects not only the ease of steering, but also the steering stability particularly during the running of the vehicle over a irregular road.

A similar phenomenon occurs during the cornering of the vehicle, that is, during the turning of the vehicle in a direction either leftwards or rightwards. More specifically, during the cornering of the vehicle along a curve, the outer wheel rotates on or follows a path having a larger radius than the path of the inner wheel resulting in increased pressure of contact of the outer wheel with the road surface while the vehicle superstructure tilts laterally under the influence of centrifugal force and, at this time, the various elastic bushings used at the various joints of the arm member 3 are elastically deformed to such an extent as to increase the tendency of the wheel 2 to toe out. This results in over-steerability, that is, the steering stability is adversely affected. This also happens even when the wind blows the vehicle in a direction transversely of the vehicle during the running of the vehicle.

A rear wheel suspension wherein the front and rear arms, corresponding to the arms 3b and 3c shown in FIG. 1, extend from the wheel carrier in substantially parallel relation to each other to different lateral portions of the vehicle chassis is well known and is disclosed, for example, in the Japanese Patent Publication No. 51-21494 published for opposition on July 2, 1976. Even this type of rear wheel suspension has a type disclosed in the Japanese Patent Publication disadvantages similar to those described in connection with the rear wheel suspension having the construction shown in FIG. 1.

A rear wheel suspension wherein the front and rear arms, which are separate from each other, have different lengths and extend parallel or approximately parallel to each other is disclosed in U.S. Pat. No. 3,759,542, patented on Sept. 18, 1973. With the construction disclosed in this U.S. patent, for a slight displacement of the wheel, the tendency of the wheel to toe in is small. Where the amount of the toe-in of the wheel is desired to be increased, the difference in length between the front and rear arms must be larger for the limited space available for the installation of the wheel suspension.

SUMMARY OF THE INVENTION

Accordingly, the present invention has been made with view to substantially eliminating the disadvantages and inconveniences inherent in the prior art rear wheel suspensions and has for its essential object to provide an improved rear wheel suspension for motor vehicles wherein the tendency of the wheel to toe in is enhanced.

Another object of the present invention is to provide an improved rear wheel suspension wherein, even if the wheel carrier is easily displaceable relative to the vehicle chassis for improving the riding quality, the steering stability will not be adversely affected.

A further object of the present invention is to provide an improved rear wheel suspension in which both good steering stability and good riding quality are present.

A still further object of the present invention is to provide an improved rear wheel suspension which requires neither an increased manufacturing cost nor a relatively large space for installation thereof in the vehicle.

To this end, the present invention provides an improved rear wheel suspension which comprises a wheel support including a wheel carrier having a wheel journal or axle for the support of a wheel for rotation independently of the wheel carrier, and first and second arms extending in spaced relation to each other from the wheel carrier to the vehicle chassis in a direction generally transversely of the vehicle chassis. The first arm has one end hingedly and yieldingly connected to a front portion of the wheel carrier and the other end hingedly and yieldingly connected to a front lateral portion of the vehicle chassis whereas the second arm has one end hingedly and yieldingly connected to a rear portion of the wheel carrier and the other end hingedly and yieldingly connected to a rear lateral portion of the chassis.

The improved rear wheel suspension further comprises a connecting member for elastically connecting the wheel support to the vehicle chassis for displacement in a direction generally perpendicular to the widthwise direction of the vehicle chassis, and a shock absorber of any known construction for absorbing the up-and-down motion of the wheel in a direction generally perpendicular to the road surface.

In accordance with the present invention, the distance measured in a direction parallel to the longitudinal axis of the vehicle chassis between a first vertical plane generally perpendicular to the longitudinal axis of the vehicle chassis in which the joint between the one end of the first arm and the front portion of the wheel carrier lies and a second vertical plane parallel to the first vertical plane in which the joint between the one end of the second arm and the rear portion of the wheel carrier lies is less than the distance measured in a direction parallel to the longitudinal axis of the vehicle chassis between a third vertical plane generally perpendicular to the longitudinal axis of the vehicle chassis in which the joint between the other end of the first arm and the front lateral portion of the vehicle chassis lies and a fourth vertical plane parallel to the first, second and third vertical planes in which the joint between the other end of the second arm and the rear lateral portion of the vehicle chassis lies. The first mentioned and second mentioned distances this defined will be referred to as "longitudinal straight distance on the side of the wheel carrier" and "longitudinal straight distance on the side of the vehicle chassis", respectively, throughout the specification and the appended claims.

Preferably, these first and second arms extend outwardly from the wheel carrier so as to diverge from each other at different angles of inclination relative to a vertical plane parallel to the longitudinal axis of the wheel carrier and containing the respective joints between the one ends of the first and second arms and the front and rear portions of the wheel carrier, both of said angles of inclination being however greater than 90°. The angle of inclination of the first arm relative to the vertical plane parallel to the longitudinal axis of the wheel carrier and containing the respective joints between the one ends of the first and second arms and the front and rear portions of the wheel carrier is greater than the angle of inclination of the second arm relative to said vertical plane.

According to the present invention, since the longitudinal straight distance on the side of the wheel carrier is smaller than the longitudinal straight distance on the side of the vehicle chassis and/or the angle of inclination of the first arm is greater than the angle of inclination of the second arm, the tendency of the wheel to toe out, which occurs when a load is applied to the area of contact of the wheel, specifically, the tire with the road surface in a direction rearwardly of the vehicle, such as occurs during running on an irregular road, the cornering and/or the lateral displacement of the vehicle superstructure due to the force of the lateral wind, can advantageously be counteracted by the tendency of the wheel to toe in. Therefore, depending upon the magnitude of the load applied to the area of contact of the wheel with the road surface, the wheel supported by the wheel suspension according to the present invention can be kept pointing straight ahead in the direction of advance of the vehicle or forced to toe in. This is advantageous in that the steering stability of the vehicle can be improved without adversely affecting the riding quality of the vehicle.

BRIEF DESCRIPTION OF THE DRAWINGS

These and other objects and features of the present invention will become apparent from the following description taken in conjunction with preferred embodiments thereof with reference to the accompanying drawings, in which.

DETAILED DESCRIPTION OF THE INVENTION

Figure 1:
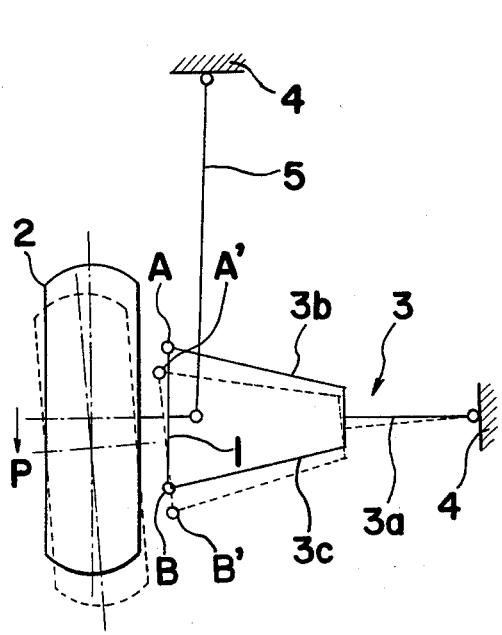
FIG. 1 is a schematic plan view of the prior art rear wheel suspension, reference to which has already been made.

Before the description of the present invention proceeds, it is to be noted that like parts are designated by like reference numerals throughout the accompanying drawings. It is also to be noted that, for the sake of brevity, the present invention will be described in connection with only the rear wheel suspension used to support the left-hand rear wheel of an at least three-wheeled motor vehicle.

Referring now to FIGs. 2 to 5, the independent rear wheel suspension according to the first preferred embodiment of the present invention comprises a wheel support and a shock absorber which are respectively generally identified by WS and SA. The wheel support WS comprises a wheel carrier 1 having first and second bearing shafts 1a and 1b extending in coaxial relation to each other in a direction oppsite to each other. These first and second bearing shafts 1a and 1b may be constituted by either the opposed end portions of a single rod member extending through the body of the wheel carrier 1 or separate shaft members formed integrally with or otherwise rigidly connected to the body of the wheel carrier 1. The wheel carrier 1 also has a lateral projection 1c which provides a seat for the shock absorber SA as will be described later.

Although not shown, the wheel carrier 1 further has a journal or axle structure of any known construction for the support of the wheel 2 thereon in a manner so that it is rotatable independently of the wheel carrier 1 in a plane generally perpendicular to the road surface R and parallel to the longitudinal axis of a vehicle chassis shown by 4.

Figure 4:
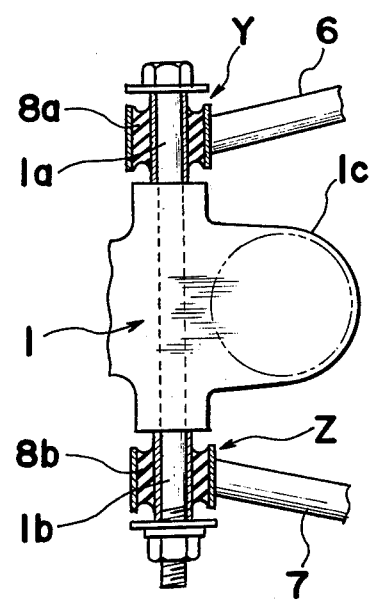
FIG. 4 is a cross sectional view, on an enlarged scale, taken along the line IV—IV in FIG. 2.

The wheel support WS further comprises front and rear transverse arms 6 and 7 extending in spaced relation to each other between the wheel carrier 1 and the vehicle chassis 4 in a manner which will now be described. The front and rear transverse arms 6 and 7 have their respective first ends hingedly and yieldingly mounted at Y and Z on the bearing shafts 1a and 1b by means of corresponding bushings 8a and 8b of elastic material such as rubber, as best shown in FIG. 4. In this arrangement, it is clear that, while the front and rear arms 6 and 7 are freely rotatable about the associated bearing shafts 1a and 1b, they are also pivotable through a certain angle in any direction in a plane parallel to the longitudinal axis of respective bearing shafts 1a and 1b because of the elasticity of the elastic bushings 8a and 8b. The front and rear arms 6 and 7 also have their respective second ends opposite to the first ends thereof hingedly and yieldingly connected at W and X to front and rear lateral portions of the vehicle chassis 4 in a manner similar to the connection of the first ends of the front and rear arms 6 and 7 to the associated bearing shafts 1a and 1b as shown in FIG. 4, substantially intermediate portions of said front and rear arms 6 and 7 extending in spaced relation to each other with the space therebetween gradually increasing as they extend outwards from the wheel carrier 1.

Figure 6:
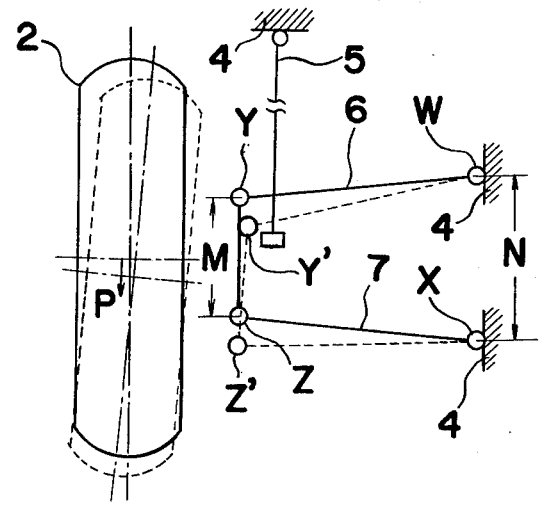
FIG. 6 is a view similar to FIG. 1, showing the operation of the rear wheel suspension shown in FIGS. 2 to 4.

Because the front and rear arms 6 and 7 extending outwardly from the wheel carrier 1 diverge from each other, the longitudinal straight distance on the side of the wheel carrier 1 as defined hereinbefore and shown by M in FIG. 6, that is, the distance as measured in the direction longitudinally of the vehicle chassis 4 between a vertical plane perpendicular to the longitudinal axis of the bearing shafts 1a and 1b and containing the joint Y and a vertical plane perpendicular to the longitudinal axis of the bearing shafts 1a and 1b and containing the joint Z, is less than the longitudinal straight distance on the side of the vehicle chassis 4 as defined hereinbefore and shown by N in FIG. 6, that is, the distance as measured in the direction longitudinally of the vehicle chassis 4 between a vertical plane generally perpendicular to the longitudinal axis of the vehicle chassis 4 and containing the joint W and a vertical plane generally perpendicular to the longitudinal axis of the vehicle chassis 4 and containing the joint X.

Preferably, the angle $\theta a$ of inclination of the front arm 6 relative to a vertical plane parallel to the longitudinal axis of the wheel carrier 1 and containing the respective joints Y and Z is selected so as to be greater than the angle $\theta b$ of inclination of the rear arm 7 relative to the same vertical plane.

Figure 3:
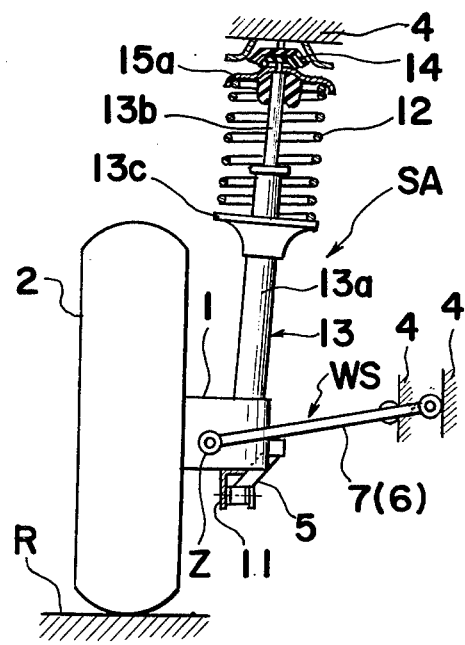
FIG. 3 is a rear elevational view, partly in section, of the rear wheel suspension shown in FIG. 2.
Figure 2:
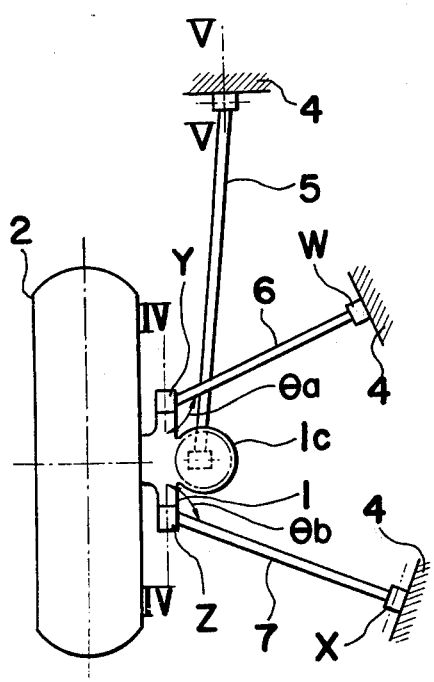
FIG. 2 is a schematic top plan view of a rear wheel suspension according to a preferred embodiment of the present invention.
Figure 5:
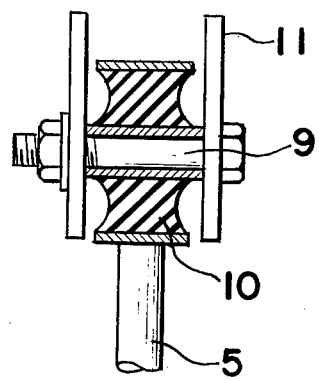
FIG. 5 is a cross sectional view, on an enlarged scale, taken along the line V—V in FIG. 2.

The wheel support WS further comprises a connecting member which is shown in the form of a tension rod 5 having one end hingedly and yieldingly connected to a front portion of the vehicle chassis 4 and the other end hingedly and yieldingly mounted on a cross bar 9 by means of an elastic bushing 10 as best shown in FIG. 5, said cross bar 9 being suspended from the lateral projection 1c of the wheel carrier 1 by means of a bracket 11 which is secured to said lateral projection 1c at a position opposite to the shock absorber SA as best shown in FIG. 3. A substantially intermediate portion of the tension rod 5 extends in a direction generally transversely to the front and rear arms 6 and 7. It is to be noted that the joint between the first mentioned end of the tension rod 5 and the front portion of the vehicle chassis 4 is similar to that between the second mentioned end of the tension rod and the bracket 11 as shown in FIG. 5. As best shown in FIG. 5, the cross bar 9 may be in the form of a bolt and nut. It is also to be noted that because of the employment of the elastic bushings at the respective joints between the first mentioned end of the tension rod 5 and the front portion of the vehicle chassis 4 and between the second mentioned end of the tension rod 5 and the bracket 11, the wheel carrier 1 is displaceable elastically in a direction longitudinally of the vehicle chassis 4.

Referring particularly to FIG. 3, the shock absorber SA illustrated may have any known construction and is shown as comprising a coil spring 12 and a telescopically extendable strut 13. The strut 13 includes a sleeve 13a having one end formed integrally with, or otherwise non-removably seated on, the lateral projection 1c of the wheel carrier 1, and a piston rod 13b having one end telescopically movably inserted in the sleeve 13a and the other end universally movably connected to an overhanging portion of the vehicle chassis 4, the piston rod 13b being normally biased outwardly relative to the sleeve 13a by the action of the coil spring 12 which is interposed between a spring seat 15a, connected to the overhanging portion of the vehicle chassis 4 through a rubber cushion 14 in coaxial relation to the piston rod 13b, and an annular flange 13c integral or fast with the sleeve 13a.

It is to be noted that the shock absorber SA need not be limited to the construction as shown, but may be constituted solely by a coil spring or a hydropneumatic device, or by a combination thereof.

The operation of the rear wheel suspension having the construction hereinbefore described will now be described with particular reference to FIG. 6.

Assuming that the load P acts on the area of contact of the wheel 2 with the road surface R in a direction rearwardly of the vehicle as shown by the arrow and opposite to the direction of movement of the vehicle during cornering, running on an irregular road and/or the lateral tilt of the vehicle superstructure due to the force of a lateral wind, the tension rod 5 is pulled axially outwardly in a direction away from the front portion of the vehicle chassis 4 and the elastic bushing 10 is consequently deformed, thereby resulting in pivotal movement of the front and rear arms 6 and 7 about the joints W and X in a direction rearwardly of the vehicle chassis 4. At this time, because the front and rear arms 6 and 7 extend outwardly from the vehicle chassis 4 in a direction laterally and obliquely rearwardly of the vehicle chassis 4 and in a direction laterally and obliquely frontwardly of the vehicle chassis, respectively, and the longitudinal straight distance M is smaller than the longitudinal straight distance N, the joint Y is shifted to a position Y' in a direction obliquely inwardly toward the vehicle chassis 4 while the joint Z is shifted to a position Z' in a direction obliquely outwardly from the vehicle chassis 4. The position Y' of the joint Y is spaced further away in a direction rearwardly of the vehicle chassis 4 from a vertical plane transversely of the vehicle chassis 4 in which the joint W lies whereas the position Z' of the joint Z is located in alignment with or adjacent a vertical plane transversely of the vehicle chassis 4 in which the joint X lies. Therefore, the joints Y and Z are, when the front and rear arms 6 and 7 pivot in the manner described above, moved inwardly and outwardly, respectively, of the vehicle chassis in a plane generally parallel to the ground surface R, to the respective positions Y' and Z', whereby the wheel 2 is given a tendency to toe in as shown by the broken lines in FIG. 6. It is to be noted that, although elastic deformation of the elastic bushings 8a and 8b at the joints Y and Z as shown in FIG. 4 which takes place during the pivotal movement of the front and rear arms 6 and 7 in the manner described above appears to cause the wheel 2 to have a tendency to toe out, this tendency of the wheel to toe out as a result of the elastic deformation of the bushings 8a and 8b at the joints Y and Z is counteracted by the tendency of the wheel to toe in as a result of the displacement of the joints Y and Z to the respective positions Y' and Z' and, therefore, the wheel 2 can be kept pointing straight ahead without being toed out nor in or given a tendency to toe in.

It is also to be noted that the amount of displacement of the position of the joints Y and Z to the respective positions Y' and Z' varies depending on the magnitude of the load P and/or the elastic forces exerted by the elastic bushings employed in the various joints between the front and rear arms 6 and 7 and the vehicle chassis 4 and the wheel carrier 1 whereas the magnitude of the tendency of the wheel 2 to toe in can be selected as desired by suitably selecting the values of the longitudinal straight distances M and N and/or the angles $\theta a$ and $\theta b$ of inclination of the respective front and rear arms 6 and 7.

Although in the foregoing description the front and rear arms 6 and 7 have been described as extending outwardly from the vehicle chassis 4 in a direction laterally and obliquely rearwardly of the vehicle chassis 4 and in a direction laterally and obliquely frontwardly of the vehicle chassis 4, respectively, it is possible to make the front arm 6 extend outwardly from the vehicle chassis 4 in a direction at right angles to the longitudinal axis of the vehicle chassis 4 while the rear arm 7 extends outwardly from the vehicle chassis 4 in a direction laterally and obliquely frontwardly of the vehicle chassis 4. Alternatively, it is also possible to make the front arm 6 extend outwardly from the vehicle chassis 4 in a direction laterally and obliquely rearwardly of the vehicle chassis 4 while the rear arm 7 extends outwardly from the vehicle chassis 4 in a direction at right angles to the longitudinal axis of the vehicle chassis 4.

Figure 7:
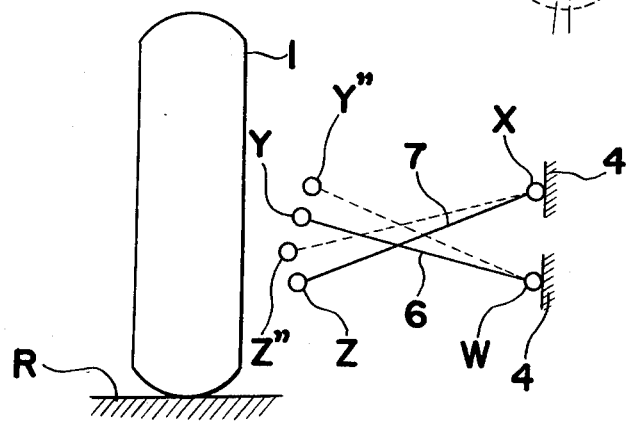
FIG. 7 is a rear elevational view of the rear wheel suspension according to another preferred embodiment of the present invention.

Furthermore, the tendency of the wheel 2 to toe in can be enhanced if the front and rear arms 6 and 7, while satisfying the requirement of the longitudinal straight distance M being smaller than the longitudinal straight distance N, extend so as to cross each other when viewed from the rear or front of the vehicle as best shown in FIG. 7. More specifically, in the embodiment shown in FIG. 7, the front arm 6 extends outwardly and downwardly from the wheel carrier 1 to the front lateral portion of the vehicle chassis 4 while the rear arm 7 extends outwardly and upwardly from the wheel carrier 4 to the rear lateral portion of the vehicle chassis 4, and in this arrangement the joints X and Y are respectively positioned above the joints W and Z.

In the construction shown in FIG. 7, when the wheel 2 is upwardly shifted during cornering or during running on an irregular road, the joint Y will be displaced upwardly and inwardly of the vehicle to a position shown by Y" while the joint Z will be displaced upwardly and outwardly of the vehicle to a position shown by Z", thereby causing the wheel 2 to have a tendency to toe in. In particular, during the cornering of the vehicle, for example, a leftward turn of the vehicle, the load on the vehicle which has been equally distributed on the left-hand and right-hand front and rear wheels move so as to be concentrated on the right-hand front and rear wheels under the influence of acceleration acting in a direction transversely of the vehicle with the pressure of contact of the tire treads of the right-hand wheels on the road surface R being increased. Under this condition and when the loaded wheels are subsequently bounced, the right-hand wheels tend to toe out. However, this tendency can be substantially eliminated by the construction shown in FIG. 7. In other words, the construction shown in FIG. 7 is advantageous in that the tendency of the wheel to toe in can be achieved even when such wheel is bounced.

In the foregoing embodiments, the shock absorber SA has been described as being mounted on the wheel carrier 1 as best shown in FIG. 3. However, in the embodiment shown in FIGS. 8 and 9, the shock absorber SA is mounted on a support arm 16 and interposed between the overhanging portion of the vehicle chassis 4 and the support arm 16. This support arm 16 has one end hingedly and yieldingly connected to a projection 1d integral with and protruding upwards from the wheel carrier 1 and also has a pair of forked ends opposite to the wheel carrier 1 which are hingedly and yieldingly connected to a lateral portion of the vehicle chassis 4 above and substantially intermediately between the front and rear lateral portions of the vehicle chassis 4 where the joints W and X lie respectively. This support arm 16 extends between the wheel carrier 1 and the vehicle chassis 4 at a level above the front and rear arms 6 and 7 as clearly understood from FIG. 9. The shock absorber SA shown in FIGS. 8 and 9 is a coil spring, but it may have a construction which has been described with reference to and shown in FIG. 3.

Figure 8:
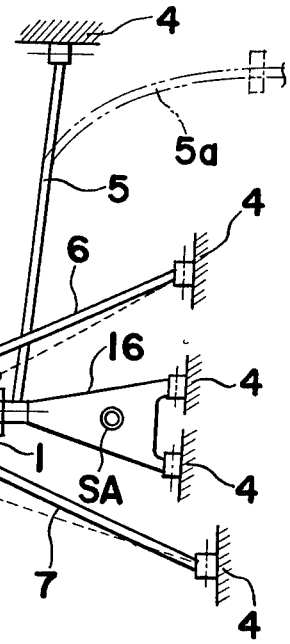
FIG. 8 is a schematic top plan view of the rear wheel suspension according to a further preferred embodiment of the present invention.
Figure 9:
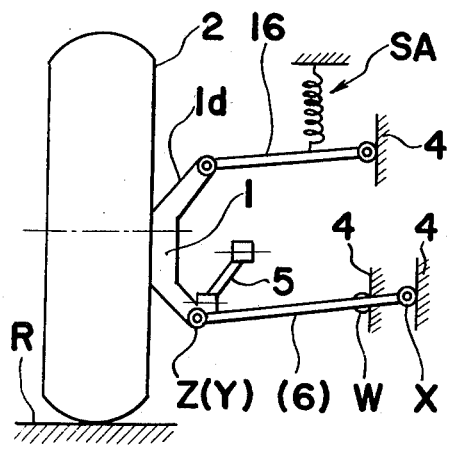
FIG. 9 is a rear elevational view of the rear wheel suspension shown in FIG. 8.

The wheel suspension having the construction shown in FIGS. 8 and 9 operates in a manner similar to that shown in FIGS. 2 to 5.

Although the present invention has been fully described in connection with the preferred embodiments thereof with reference to the accompanying drawings, it is to be noted that various changes and modifications will be apparent to those skilled in the art. By way of example, as shown by the chain lines in FIG. 8, the tension rod 5 may be replaced with a stabilizer rod 5a. In addition, although the tension rod 5 has been described as connected to the wheel carrier 1, particularly the lateral projection 1c, it may be connected hingedly and yieldingly to a portion of the front arm 6 adjacent the wheel carrier 1.

Such changes and modifications are, therefore, to be understood as being included within the true scope of the present invention unless they depart therefrom.

We claim:

1. A rear wheel suspension for a vehicle having a vehicle chassis, said suspension comprising: a rear wheel support including a wheel carrier for supporting a rear wheel for rotation independently of the wheel carrier; front and rear arm members for supporting the wheel carrier on the vehicle chassis, each of said front and rear arm members having one end hingedly and yieldingly connected to the wheel carrier and the other end hingedly and yieldingly connected to the vehicle chassis, said front and rear arm members extending laterally in spaced relation to each other between the vehicle chassis and the wheel carrier; said front and rear arm members extending outwardly from the wheel carrier towards the vehicle chassis and diverging from each other with the space therebetween gradually increasing towards the vehicle chassis, the longitudinal straight distance as measured in a direction longitudinally of the vehicle chassis between the first vertical plane generally perpendicular to the longitudinal axis of the vehicle chassis and containing therein the joint between said one end of the front arm member and a front portion of the wheel carrier and a second vertical plane parallel to the first vertical plane and containing the joint between said one end of the rear arm member and a rear portion of the wheel carrier being smaller than the longitudinal straight distance as measured in a direction longitudinally of the vehicle chassis between a third vertical plane generally perpendicular to the longitudinal axis of the vehicle chassis and containing the joint between said other end of the front arm member and a front lateral portion of the vehicle chassis and a fourth vertical plane parallel to the first, second and third vertical planes and containing the joint between said other end of the rear arm member and a rear lateral portion of the vehicle chassis; a connecting member for elastically connecting the wheel support of the vehicle chassis for displacement in a direction generally horizontal and perpendicular to the widthwise direction of the vehicle chassis, said connecting member having one end connected to the vehicle chassis and the other end connected to the wheel carrier; and a shock absorber means for absorbing vibrations of the wheel carrier which may take place in a direction generally at right angles to the road surface during the running of the vehicle; whereby when a load acting in a direction rearwardly of the vehicle is imposed on the area of contact of the rear wheel with a road surface and the wheel carrier is consequently forcibly displaced rearwardly of the vehicle chassis, the wheel carrier is moved such that the toe-in of the wheel support is thereby increased.

2. A wheel suspension as claimed in claim 1, wherein said front and rear arm members are inclined at respective first and second predetermined angles relative to a vertical plane parallel to the longitudinal axis of the wheel carrier and containing the respective joints between the first ends of the front and rear arm members and the front and rear portions of the wheel carrier, both of said first and second predetermined angles of inclination of the front and rear arm members being greater than 90° and said first predetermined angle of inclination of the front arm member being greater than the second predetermined angle of inclination of the rear arm member.

3. A wheel suspension as claimed in claim 1, wherein the front arm member extends outwardly from the vehicle chassis to the wheel carrier in a direction obliquely rearwardly of the vehicle chassis while the rear arm member extends outwardly from the vehicle chassis to the wheel carrier in a direction obliquely frontwardly of the vehicle chassis.

4. A wheel suspension as claimed in claim 1, wherein said connecting member has one end adjacent the wheel support hingedly and yieldingly connected to the wheel carrier.

5. A wheel suspension as claimed in claim 1, wherein said connecting member has one end adjacent the wheel support hingedly and yieldingly connected to a portion of the front arm member adjacent the wheel carrier.

6. A wheel suspension as claimed in claim 1, wherein the shock absorber means is positioned between the wheel carrier and an overhanging portion of the vehicle chassis.

7. A wheel suspension as claimed in claim 1, wherein said suspension further comprises a support arm having one end hingedly and yieldingly connected to the wheel carrier and the other end hingedly and yieldingly connected to the vehicle chassis, and said shock absorber means is positioned between an overhanging portion of the vehicle chassis and said support arm.

8. A wheel suspension as claimed in claim 1, wherein the joint between the first end of the front arm member and the front portion of the wheel carrier and the joint between the second end of the rear arm member and the rear lateral portion of the vehicle chassis are located above the joint between the first end of the rear arm member and the rear portion of the wheel carrier and the joint between the second end of the front arm member and the front lateral portion of the vehicle chassis, respectively, with the front and rear arm members extending between the wheel carrier and the vehicle chassis crossing each other when viewed from the front or rear of the vehicle.

* * * * *